(12) United States Patent
Hinz et al.

(10) Patent No.: US 7,268,204 B2
(45) Date of Patent: Sep. 11, 2007

(54) COMPLEX OF A MULTIMETAL CYANIDE COMPOUND AND METHODS OF FORMING POLYETHERCARBONATE POLYOLS

(75) Inventors: Werner Hinz, Grosse Ile, MI (US); Jacob Wildeson, Chambersburg, PA (US); Edward M. Dexheimer, Grosse Ile, MI (US)

(73) Assignee: BASF Corporation, Florham Park, NJ (US)

( * ) Notice: Subject to any disclaimer, the term of this patent is extended or adjusted under 35 U.S.C. 154(b) by 88 days.

(21) Appl. No.: 11/091,981

(22) Filed: Mar. 29, 2005

(65) Prior Publication Data
US 2006/0223972 A1    Oct. 5, 2006

(51) Int. Cl.
*C08G 64/00* (2006.01)

(52) U.S. Cl. ............ 528/196; 502/150; 521/172; 528/198; 528/403; 528/405; 528/411; 528/412; 528/413; 528/415; 528/419

(58) Field of Classification Search ......... 502/150; 528/196, 198, 403, 405, 411, 412, 413, 415, 528/419; 521/172
See application file for complete search history.

(56) References Cited

U.S. PATENT DOCUMENTS

| | | | |
|---|---|---|---|
| 4,472,560 A | 9/1984 | Kuyper et al. | |
| 4,500,704 A | 2/1985 | Kruper, Jr. et al. | |
| 4,826,887 A | 5/1989 | Kuyper et al. | |
| 4,826,952 A | 5/1989 | Kuyper et al. | |
| 4,826,953 A | 5/1989 | Kuyper et al. | |
| 6,303,833 B1 | 10/2001 | Grosch et al. | |
| 6,713,599 B1 * | 3/2004 | Hinz et al. | 528/408 |
| 6,762,278 B2 * | 7/2004 | Hinz et al. | 528/405 |
| 2003/0032761 A1 | 2/2003 | Hofmann et al. | |

* cited by examiner

*Primary Examiner*—Terressa Boykin
(74) *Attorney, Agent, or Firm*—Fernando A. Borrego

(57) ABSTRACT

A method of forming a polyethercarbonate polyol enhances incorporation of $CO_2$ into the polyethercarbonate polyol. The method provides a catalyst including a multimetal cyanide compound. The multimetal cyanide compound has an ordered structure defined by a cationic catalytic center and an anionic backbone with the anionic backbone spatially arranged about the cationic catalytic center. The anionic backbone is modified with a supplemental anionic spacer to affect the spatial arrangement and catalytic activity of the cationic catalytic center. The supplemental anionic spacer is incorporated into the multimetal cyanide compound to establish the general formula, $M^1_a[M^2_b(CN)_c M_d^3 X_e]_f$, wherein $M^1$, $M^2$, and $M^3$ are various metal ions and X is the supplemental anionic spacer. An H-functional initiator, an alkylene oxide, and $CO_2$ are reacted in the presence of the modified multimetal cyanide compound to form the polyethercarbonate polyol.

24 Claims, No Drawings

COMPLEX OF A MULTIMETAL CYANIDE COMPOUND AND METHODS OF FORMING POLYETHERCARBONATE POLYOLS

TECHNICAL FIELD

The present invention generally relates to a complex of a multimetal cyanide compound and methods of forming polyethercarbonate (PEC) polyols.

BACKGROUND OF THE INVENTION

Polyethercarbonate (PEC) polyols are known in the art. PEC polyols are utilized, in conjunction with a cross-linking agent, such as an isocyanate, to produce polyurethane polymers. The polyurethane polymers can be foamed or non-foamed, i.e., elastomeric. Generally, PEC polyols are the polymerization reaction product of an H-functional initiator, an alkylene oxide, and $CO_2$ and these reactants are reacted in a reactor in the presence of a catalyst. More specifically, the PEC polyols are formed as a result of copolymerization of the alkylene oxides and $CO_2$. Recently, there has been a significant focus on using catalysts that include a multimetal cyanide compound to catalyze the reaction of the H-functional initiator, the alkylene oxide, and $CO_2$ to form the PEC polyols.

Although the recent focus has been to use conventional multimetal cyanide compounds, such as $Zn_3[Co(CN)_6]_2$, it has been observed that these conventional compounds are not well suited for catalyzing the copolymerization of alkylene oxide with $CO_2$ to yield the PEC polyol. When using the conventional multimetal cyanide compound, the extent that the $CO_2$ is incorporated into the PEC polyol, specifically into the desired alkylene oxide—$CO_2$ copolymer, is limited and difficult to control. Conventional multimetal cyanide compounds can possess amorphous structures and it is believed that, in part, these properties of conventional multimetal cyanide compounds contribute to the overall lack of activity of the catalysts in the copolymerization of alkylene oxide with $CO_2$. As a result of the above, high $CO_2$ pressures and/or low process temperatures are required to generate PEC polyols with adequate $CO_2$ content. It is known that high $CO_2$ pressures are undesirable due to the high cost of high pressure equipment and low process temperatures are undesirable due to the high catalyst (multimetal cyanide compound) concentrations and/or long cycle times required when low process temperatures are employed. Additionally, when using the conventional multimetal cyanide compound to form the PEC polyol, formation of cyclic alkylene carbonate as an undesirable byproduct of the copolymerization of the alkylene oxide and $CO_2$ is considerable.

Instead of being used to form PEC polyols, it is known that conventional multimetal cyanide compounds are more suited for the homopolymerization of alkylene oxide to form a polyether polyol. Multimetal cyanide compounds have ordered structures that are defined by cationic catalytic centers and anionic backbones. The anionic backbones are spatially arranged about the cationic catalytic centers and these cationic catalytic centers of the multimetal cyanide compounds are ideally spaced to promote the homopolymerization of alkylene oxides to form the polyether polyol. Due to this ideal spacing, it is contemplated that the conventional multimetal cyanide compounds are essentially too active for the homopolymerization of alkylene oxide and, therefore, the growing carbonate chain ends in the PEC polyol are biased toward polymerization with alkylene oxide rather than $CO_2$.

In view of the limitations associated with conventional multimetal cyanide compounds when used to form PEC polyols, including those limitations described above, there remains an opportunity to modify these multimetal cyanide compounds such that the compounds are more suitable for use in the formation of the PEC polyol. There also remains an opportunity to avoid use of the conventional multimetal cyanide compounds, which inherently have ideal spatial arrangements, altogether.

SUMMARY OF THE INVENTION AND ADVANTAGES

Methods of forming a polyethercarbonate (PEC) polyol are disclosed. In one instance, the method includes the step of providing a catalyst. The catalyst comprises a multimetal cyanide compound. The multimetal cyanide compound has an ordered structure defined by a cationic catalytic center and an anionic backbone. The anionic backbone is spatially arranged about the cationic catalytic center. The method also includes the step of modifying the anionic backbone of the multimetal cyanide compound. Modification of the anionic backbone affects the spatial arrangement and catalytic activity of the cationic catalytic center. The method also includes reacting an H-functional initiator, an alkylene oxide, and $CO_2$ in the presence of the modified multimetal cyanide compound to form the PEC polyol.

This method permits one to efficiently form PEC polyols by enhancing incorporation of the $CO_2$ into the PEC polyol. The method accomplishes this enhanced incorporation by modifying the anionic backbone of the multimetal cyanide compound. The modified multimetal cyanide compound is particularly suited for the copolymerization of alkylene oxides and $CO_2$. The spacing associated with the cationic catalytic centers of the conventional multimetal cyanide compounds, which once again is ideally suited for the homopolymerization of alkylene oxide, is disrupted upon modification of the anionic backbone. As a result, the modified multimetal cyanide compound of the present invention is more suitable for the copolymerization of alkylene oxides and $CO_2$. While not intending to be bound by theory, it is believed that with the modified multimetal cyanide compound of the present invention, the spacing between cationic catalytic centers is increased and the modified multimetal cyanide compound has a more irregular crystal structure that lessens the bias of growing polymer chain ends toward homopolymerization with alkylene oxide.

A further method of forming the PEC polyol provides a catalyst comprising a multimetal cyanide compound with a unique anionic backbone in lieu of modifying the anionic backbone. More specifically, in this method, the anionic backbone is of the general formula $$[X(CN)_y]^{z-}$$

wherein X is selected from the group of $Fe^{2+}$, $Cu^{2+}$, $Zn^{2+}$, and $Ni^{2+}$, y is a value from 3 to 4, and z is a value from 1 to 2 satisfying the valency state of X.

The H-functional initiator, the alkylene oxide, and the $CO_2$ are reacted in the presence of this multimetal cyanide compound to form the PEC polyol.

This method also permits one to efficiently form PEC polyols by enhancing incorporation of the $CO_2$ into the PEC polyol. The method accomplishes this enhanced incorporation with the unique anionic backbone of the multimetal cyanide compound. The unique anionic backbone of the multimetal cyanide compound is more suited for the copolymerization of alkylene oxides and $CO_2$, as opposed to the conventional homopolymerization of alkylene oxide to form a conventional polyether polyol. This unique anionic backbone introduces distinct spacing with the cationic catalytic centers as compared to the spacing associated with the cationic catalytic centers of the conventional multimetal cyanide compounds. As a result, the multimetal cyanide compound with the unique anionic backbone is more suitable for the copolymerization of alkylene oxides and $CO_2$. While not intending to be bound by theory, it is believed that with this unique multimetal cyanide compound, the spacing between cationic catalytic centers is increased and the multimetal cyanide compound has a more irregular crystal structure that lessens the bias of growing polymer chain ends toward homopolymerization with alkylene oxide.

With either method of the present invention, because the $CO_2$ is more effectively incorporated into the PEC polyol, high $CO_2$ pressures and low process temperatures are not required. Thus, high pressure equipment, high catalyst concentrations, and long cycle times are not required with these methods. Additionally, with these methods, and more specifically with the modified multimetal cyanide compound and/or the multimetal cyanide compound with the unique anionic backbone, formation of undesirable cyclic alkylene carbonate byproducts is reduced.

DETAILED DESCRIPTION OF PREFERRED EMBODIMENTS

Methods of forming a polyethercarbonate (PEC) polyol are disclosed. Preferably, the PEC polyols formed according to the present invention are utilized, in conjunction with a suitable cross-linking agent, such as an isocyanate, to produce foamed and non-foamed, i.e., elastomeric, polyurethane polymers. Further, as described below, the PEC polyols formed according to the present invention have enhanced incorporation of $CO_2$ in the PEC polyol.

In one embodiment, the method provides a catalyst that comprises a multimetal cyanide compound and modifies the multimetal cyanide compound. As the multimetal cyanide compound is being modified, or after the multimetal cyanide compound has been modified, the method comprises reacting an H-functional initiator, an alkylene oxide, and $CO_2$ (collectively referred to as "the reactants"). The reactants are reacted, preferably under a positive pressure in a reactor, in the presence of the modified multimetal cyanide compound to form the PEC polyol. Thus, the PEC polyol is the polymerization reaction product of the reactants and is essentially a copolymer of alkylene oxide and $CO_2$ formed in the presence of the modified multimetal cyanide compound. Although not required, it is preferred that the reactor is a large-scale semi-batch reactor, such as an industrial autoclave.

The multimetal cyanide compound has an ordered structure defined by a cationic catalytic center and an anionic backbone. The cationic catalytic center is the catalytic center of the multimetal cyanide compound. The anionic backbone is spatially arranged about the cationic catalytic center. It is preferred that the multimetal cyanide compound is, more specifically, of the general formula $M^1{}_a[M^2(CN)_b]$. In this general formula, $M^1$ is at least one metal ion selected from the group of $Zn^{2+}$, $Fe^{2+}$, $Co^{3+}$, $Ni^{2+}$, $Mn^{2+}$, $Co^{2+}$, $Sn^{2+}$, $Pb^{2+}$, $Fe^{3+}$, $Mo^{4+}$, $Mo^{6+}$, $Al^{3+}$, $V^{5+}$, $Sr^{2+}$, $W^{4+}$, $W^{6+}$, $Cu^{2+}$, $Cr^{2+}$, $Cd^{2+}$, $Cr^{3+}$, $Cd^{2+}$, $Hg^{2+}$, $Pd^{2+}$, $Pt^{2+}$, $V^{2+}$, $Mg^{2+}$, $Ca^{2+}$, $Ba^{2+}$, and combinations thereof, and $M^2$ is at least one metal ion selected from the group consisting of $Fe^{2+}$, $Fe^{3+}$, $Co^{3+}$, $Cr^{3+}$, $Mn^{2+}$, $Mn^{3+}$, $Rh^{3+}$, $Ru^{2+}$, $Ru^{3+}$, $V^{4+}$, $V^{5+}$, $Co^{2+}$, $Ir^{3+}$, $Cr^{2+}$, and combinations thereof. The variables a and b are integers and their possible values will be described below.

The method of the first embodiment includes modifying the anionic backbone of the multimetal cyanide compound. Modification of the anionic backbone affects the spatial arrangement and catalytic activity of the cationic catalytic center. More specifically, impact to spatial arrangement is twofold. Modification of the anionic backbone affects the spatial arrangement of the anionic backbone about the cationic catalytic center. Further, the spatial arrangement of the anionic backbone about the cationic catalytic center impacts the spatial arrangement of the cationic catalytic centers relative to each other, specifically of neighboring cationic catalytic centers, and thus the accessibility of the cationic catalytic centers for catalytic purposes.

Importantly, the anionic backbone can be modified prior to the reaction of the reactants. For instance, the anionic backbone can be modified during preparation of the multimetal cyanide compound itself. Thus, the reaction step would take place after the multimetal cyanide compound, specifically the anionic backbone, has been modified. Alternatively, the anionic backbone can be modified during the reaction of the reactants. Thus, the reaction step would take place as the multimetal cyanide compound, specifically the anionic backbone, is being modified.

To modify the anionic backbone, it is preferred that a supplemental anionic spacer is incorporated into the multimetal cyanide compound. Preferably, the supplemental anionic spacer is linear. More preferably, the supplemental anionic spacer is of the general formula $[A_1\text{-}R\text{-}A_2]^{n-}$, wherein R comprises a central organic or inorganic moiety, $A_1$ and $A_2$ comprise anionic substituents having a single or multiple negative charge, and n is an integer ranging from 1-4. In the most preferred embodiment, the supplemental anionic spacer is selected from the group of dicarboxylic acid dianions, diphosphonic acid dianions, dicyanide anions, cyanamide dianions, and combinations thereof.

For descriptive purposes, exemplary dicarboxylic acids are disclosed below.

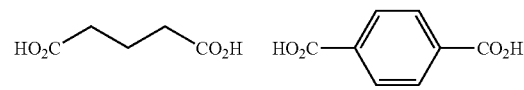

For descriptive purposes, an exemplary diphosphonic acid is disclosed below.

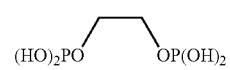

These exemplary dicarboxylic acids and the exemplary diphosphonic acid disclosed above serve as exemplary parent compounds that can be ionized to provide the most preferred dicarboxylic acid dianion supplemental anionic spacers and the most preferred diphosphonic acid dianion supplemental anionic spacers, respectively.

For descriptive purposes, exemplary dicyanide anions are disclosed below.

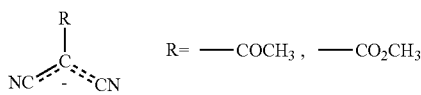

Finally, for descriptive purposes, exemplary cyanamide dianions are disclosed below.

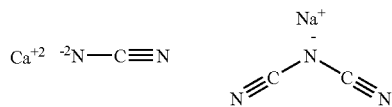

All of the exemplary supplemental anionic spacers illustrated above are linear.

The supplemental anionic spacer interacts with the multimetal cyanide compound to establish a modified multimetal cyanide compound complex. More specifically, the supplemental anionic spacer partially replaces the anionic backbone of the multimetal cyanide compound to affect the spatial arrangement and catalytic activity of the cationic catalytic center. The complex is of the general formula $M^1_a[M^2_b(CN)_cM^3_dX_e]_f$, wherein $M^1$ and $M^2$ are as described above, $M^3$ is individually at least one metal ion selected from the group of $Fe^{2+}$, $Fe^{3+}$, $Co^{3+}$, $Cr^{3+}$, $Mn^{2+}$, $Mn^{3+}$, $Rh^{3+}Ru^{2+}$, $Ru^{3+}$, $V^{4+}$, $V^{5+}$, $Co^{2+}$, $Ir^{3+}$, $Cr^{2+}$, and combinations thereof, where $M^3$ may or may not be identical to $M^2$, X is the supplemental anionic spacer, and a, b, c, d, e, and f are integers selected so that the complex is electrically neutral and c is greater than zero.

Exemplary partial structural components of such complexes are disclosed below where the supplemental anionic spacer is a dicarboxylic acid dianion and a cyanamid dianion, respectively. These structural components are partial in that they are not completely representative of the entire catalyst.

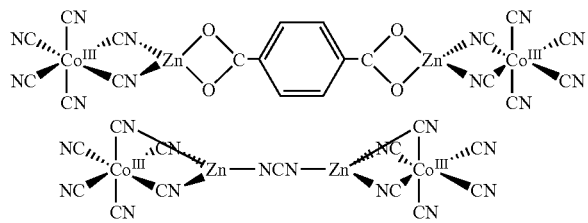

Notably, the spacing between the cationic catalytic centers of the modified multimetal cyanide compound is increased and the modified multimetal cyanide compound has a more irregular crystal structure that lessens the bias of the growing polymer chain ends toward homopolymerization with alkylene oxide.

In a second embodiment of the present invention, the anionic backbone is not modified. Instead, the anionic backbone of the ordered structure of the multimetal cyanide compound is unique. That is, an anionic backbone unique to the formation of PEC polyols surrounds the cationic catalytic center, i.e., the catalytic center, of the multimetal cyanide compound. More specifically, the anionic backbone is of the general formula $$[X(CN)_y]^{z-}$$

wherein X is selected from the group of $Fe^{2+}$, $Cu^{2+}$, $Zn^{2+}$, and $Ni^{2+}$, y is a value from 3 to 4, and z is a value from 1 to 2 satisfying the valency state of X.

In the most preferred unique anionic backbone for the multimetal cyanide compound, y is 4 and z is 2 such that the preferred formula is $[X^{2+}(CN)_4]^{2-}$. Examples of suitable anionic backbones include, but are not limited to, $[Cu^{2+}(CN)_3]^-$ (trigonal planar), $[Zn^{2+}(CN)_4]^{2-}$ (tetrahedral), and $[Ni^{2+}(CN)_4]^{2-}$ (square planar). Geometric depictions of these particular anionic backbones are included below for descriptive purposes.

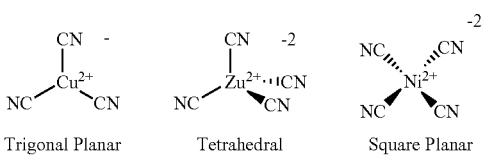

Trigonal Planar    Tetrahedral    Square Planar

With this particular multimetal cyanide compound and its unique anionic backbone, the reactants, specifically the H-functional initiator, the alkylene oxide, and the $CO_2$, are reacted to form the PEC polyol. As described above relative to the first embodiment, the reactants are preferably reacted under a positive pressure in a reactor, such as an industrial autoclave, to form the PEC polyol.

Generally, the unique anionic backbone is either a tricyanide anion or a tetracyanide anion. This general formula for the anionic backbone provides the unique multimetal cyanide compound. This unique multimetal cyanide compound has a unique crystalline structure. The unique crystalline structure is selected from the group of trigonal planar, tetrahedral, and square planar crystal structures. The definition of these crystalline structures may be found in "International Tables for Crystallography", Volume A, editor: Theor Hahn, (1995).

In this second embodiment, it is preferred that multimetal cyanide compounds with the unique anionic backbones and the resultant unique crystalline structures described above are used in combination with a second catalyst comprising a second multimetal cyanide compound having an ordered structure defined by a second cationic catalytic center and a second anionic backbone spatially arranged about the second cationic catalytic center. With this second catalyst, the second anionic backbone is of the general formula $$[X'(CN)_{y'}]^{z'-}$$

wherein X' is selected from the group of $Fe^{2+}$, $Fe^{3+}$, $Co^{2+}$, and $Co^{3+}$, y' is a value of 6, and z' is a value from 3 to 4 satisfying the valency state of X'.

This second catalyst is equivalent to the catalyst, $M^1_a[M^2(CN)_b]$, already described above prior to modification of its anionic backbone. As such, the second anionic backbone has an octahedral crystalline structure.

In sum, in this second embodiment, it is preferred that multimetal cyanide compounds with the unique anionic backbones and the resultant unique crystalline structures are used in combination with conventional multimetal cyanide compounds prior to any modification of the anionic backbones of the conventional multimetal cyanide compounds. Such a combination provides catalysts with irregular spacing between neighboring cationic catalytic centers which is more suitable for the copolymerization of alkylene oxides and $CO_2$.

As described above, the catalyst includes the multimetal cyanide compound. In the present invention, a unique catalyst, specifically a unique multimetal cyanide compound that has an anionic backbone that has been strategically modified or that has a different and unique anionic backbone altogether, is utilized. In addition to the multimetal cyanide compound, it is preferred that the catalyst further comprises at least one of: an organic complexing agent; water; a polyether; and a surface-active substance. It is more preferred that the catalyst further include all of these additional components, specifically the organic complexing agent, water, the polyether, and the surface-active substance. As a result, the catalyst is preferably used in the form of a suspension and the multimetal cyanide compound preferably has a crystalline structure, rather than the catalyst being used in a powder form and the multimetal cyanide compound having an amorphous structure. The suspension and the crystalline structure provide high catalytic activity.

Furthermore, the multimetal cyanide compound preferably has a content of platelet-shaped (i.e., platelet-like morphology) particles of at least 30% by weight, based on a weight of the multimetal cyanide compound. For the purposes of the present invention, platelet-shaped particles are particles whose thickness is one third, preferably one fifth, more preferably one tenth, of their length and width. The more preferred catalyst according to the present invention contains more than 50% by weight of such platelet-shaped particles, most preferably more than 70% by weight. Concentrations that are employed for the catalysts are typically less than 1% by weight, preferably less than 0.5% by weight, particularly preferably less than 1,000 ppm, very particularly preferably less than 500 ppm, and especially preferably less than 100 ppm, based on the total mass of the PEC polyol.

A wide variety of catalysts which include the multimetal cyanide compound are possible for use in the context of the present invention. Examples of such catalysts include, but are not limited to, the catalysts disclosed and taught in U.S. Pat. Nos. 6,303,833 and 6,762,278, the disclosures of which are hereby incorporated by reference in their entirety.

The present invention is very useful for the formation, or synthesis, of PEC polyols having functionalities of from 1 to 8, preferably from 1 to 4, and number average molecular weights of from 200 to 20,000. The PEC polyols are formed by addition polymerization of the alkylene oxide and $CO_2$ onto the H-functional initiator, like mono-alcohols and polyalcohols. Suitable H-functional initiators include, but are not limited to, alkanols such as butanol, diols such as butane diol, glycols such as dipropylene glycol, glycol monoalkyl ethers, aromatic hydroxy compounds, glycerine, trimethylol propane, and pentaerythritol. It is possible for the H-functional initiator to include one or more alkylene oxide groups for the catalyst to function more efficiently. In such a case, the H-functional initiator is first reacted with at least one alkylene oxide to form an oligomer prior to it use to form the PEC polyol. Examples include glycerine having from 1 to 6 propylene oxides attached to it, propylene glycol having 1 to 6 propylene oxides, trimethyl propane with 1 to 6 propylene oxides, dipropylene glycol with one or more alkylene oxides attached, sucrose with one or more alkylene oxides attached, sorbitol with one or more alkylene oxides attached, and blends of these oligomers. As would be understood by one of ordinary skill in the art, the oligomer can be reacted with either the same alkylene oxide used during its formation or with another alkylene oxide in the PEC polyol formation reaction.

Suitable alkylene oxides include, but are not limited to, compounds having at least one alkylene oxide group, such as example ethylene oxide, propylene oxide (1,2-epoxypropane), 1,2-methyl-2-methylpropane, butylene oxide (1,4-epoxybutane), 1,2-epoxybutane, 2,3-epoxybutane, 1,2-methyl-3-methylbutane, 1,2-epoxypentane, 1,2-methyl-3-methylpentane, 1,2-epoxyhexane, 1,2-epoxyheptane, 1,2-epoxyoctane, 1,2-epoxynonane, 1,2-epoxydecane, 1,2-epoxyundecane, 1,2-epoxydodecane, styrene oxide, 1,2-epoxycyclopentane, 1,2-epoxycyclohexane, (2,3-epoxypropyl)-benzene, vinyloxirane, 3-phenoxy-1,2-epoxypropane, 2,3-epoxy(methyl ether), 2,3-epoxy(ethyl ether), 2,3-epoxy(isopropyl ether), 2,3-epoxy-1-propanol, 3,4-epoxybutyl stearate, 4,5-epoxypentyl acetate, 2,3-epoxy propyl methacrylate, 2,3-epoxypropyl acrylate, glycidol butyrate, methyl glycidate, ethyl 2,3-epoxybutanoate, 4-(trimethylsilyl)butane 1,2-epoxide, 4-(trimethylsilyl)butane 1,2-epoxide, 3-(perfluoromethyl)propene oxide, 3-perfluoromethyl)propene oxide, 3-(perfluorobutyl)propene oxide, and also any mixtures of the abovementioned compounds.

The desired $CO_2$ content of the PEC polyol is preferably from 1 to 30%, more preferably from 2 to 20%, and most preferably from 5 to 15%, based on weight % of $CO_3$ of the PEC polyol. The PEC polyols can be prepared either batchwise, semi-continuously, or fully continuously. The process temperatures which can be employed in the synthesis typically range from 40° C. to 180° C., with preference being given to temperatures in the range from 70° C. to 130° C. Temperatures above 180° C. may result in catalyst decomposition and thus reduce catalyst activity. The $CO_2$ pressure during the reaction influences the amount of $CO_2$ incorporation. The $CO_2$ pressure may vary widely and range from 10 to 3,000 pounds per square inch (psi), preferably from 50 to 2,500 psi, and more preferably from 90 to 2,000 psi.

As initially described above, the PEC polyols formed according to the present invention are combined with the cross-linking agent to produce foamed and non-foamed polyurethane polymers. If the cross-linking agent is an isocyanate, the isocyanates that may be used preferably include isomers and derivatives of toluene diisocyanate (TDI) and diphenylmethane diisocyanate (MDI). The reaction between the hydroxyl groups and the isocyanate groups may be catalyzed by tertiary amine catalysts and/or organic tin compounds such as stannous octoate and dibutyltin dilaureate. Also, to obtain a foamed polyurethane polymer, blowing agents may be employed. In addition, stabilizers and flame retardants may be added.

The modified multimetal cyanide compound and/or the multimetal cyanide compound with the unique anionic backbone described above have been shown to improve $CO_2$ copolymerization with alkylene oxides in a number of different pathways. First, these multimetal cyanide compound designs have been shown to disfavor alkylene oxide homopolymerization by breaking up the arrangement of the cationic catalytic centers on a surface of the catalyst. Second, these multimetal cyanide compound designs have been shown to increase adsorption energy between the cationic catalytic center and the $CO_2$ monomer, thus making the $CO_2$ monomer more accessible for the desired $CO_2$/alkylene oxide copolymerization reaction. Third, these multimetal cyanide compound designs have been shown to decrease of the O=C=O($CO_2$) monomer angle to <180 degrees thereby increasing $CO_2$ polarization and activating the $CO_2$ monomer for nucleophilic attack and addition to the growing polymer chain. Fourth, these multimetal cyanide compound designs have been shown to disfavor intermediates and transition states that lead to the formation of cyclic alkylene carbonate byproducts and, instead, have been shown to favor intermediates and transition states that lead to the incorporation of $CO_2$ monomer into the growing polymer chain. Finally, these multimetal cyanide catalysts have been shown to decrease the susceptibility of the multimetal cyanide catalyst toward deactivation by water and by $CO_2$.

The following examples illustrating the formation of catalysts including the multimetal cyanide compound and formation of PEC polyols, as presented herein, are intended to illustrate and not limit the present invention.

EXAMPLES

Example 1

Comparative Multimetal Cyanide Compound Containing Catalyst

In Example 1, a conventional multimetal cyanide compound containing catalyst was prepared as follows.

Preparation of Hexacyanocobaltic Acid

An amount of 7 liters of strong acid ion exchanger in the sodium form (Amberlite® 252 Na, Rohm & Haas) was introduced into an ion exchange column (length: 1 m, volume: 7.71). The ion exchanger was subsequently converted into the H form by passing 10% strength hydrochloric acid through the ion exchange column for 9 hours at a rate of 2 bed volumes per hour, until the sodium content of the discharged solution was less than 1 ppm. The ion exchanger was subsequently washed with water until neutral. The regenerated ion exchanger was then used to prepare a hexacyanocobaltic acid which was essentially free of alkali metal. For this purpose, a 0.24 molar solution of potassium hexacyanocobaltate in water was passed through the ion exchanger at a rate of 1 bed volume per hour. After 2.5 bed volumes, the feed was changed from potassium hexacyanocobaltate solution to water. The 2.5 bed volumes obtained had an average hexacyanocobaltic acid content of 4.5% by weight and alkali metal contents of less than 1 ppm. The hexacyanocobaltic acid solutions used were diluted appropriately with water.

Preparation of a Catalyst Suspension Including the Multimetal Cyanide Compound

An amount of 479.3 g of an aqueous zinc acetate solution (13.8 g of zinc acetate dihydrate and 2.2 g of polyether Pluronic® PE 6200 (BASF Aktiengesellschaft) dissolved in 150 g of water) was heated to 50° C. While stirring (screw stirrer, stirring energy input: 1 W/1), 558 g of the aqueous hexacyanocobaltic acid solution (cobalt content: 9 g/l, 1.5% by weight of Pluronic® PE 6200 (BASF Aktiengesellschaft), based on the hexacyanocobaltic acid solution) were then metered in over a period of 20 minutes. After all the hexacyanocobaltic acid solution had been metered in, the mixture was stirred for a further 5 minutes at 50° C. The temperature was subsequently reduced to 40° C. over a period of one hour. The precipitated solid was separated from the liquid by means of a pressure filter and washed with water. The moist filter cake was subsequently dispersed in the amount of liquid required to give a 5% strength by weight multimetal cyanide suspension.

The conventional multimetal cyanide compound containing catalyst of Example 1 was prepared to illustrate the usefulness of modifying the anionic backbone and/or utilizing a multimetal cyanide compound with a unique anionic backbone compared to the conventional multimetal cyanide compound containing catalyst.

Examples 2-5

Catalysts according to the methods of the present invention were prepared according to the general method described above and as further detailed in the table below.

| Example | Multimetal Cyanide Compound | Detail |
|---|---|---|
| 2 | $Zn[Ni(CN)_4]\cdot Zn(OAc)_2$ | First step involved the synthesis of $Zn[Ni(CN)_4]$ from $Zn(OAc)_2$ and $K_2[Ni(CN)_4]$ in 2.5% L61 aqueous slurry. Second step involves recrystallization with $Zn(OAc)_2$ in a 2.5% L61 aqueous slurry. |
| 3 | $Zn[Ni(CN)_4]\cdot Zn(OAc)_2$ | First step involved the synthesis of $Zn[Ni(CN)_4]$ from $Zn(OAc)_2$ and $K_2[Ni(CN)_4]$ in 20% t-BuOH soln. Second step involves re-crystallization with $Zn(OAc)_2$ in a 20% t-BuOH aqueous soln. |
| 4 | $Zn_3[Co(CN)_6]_2$/ $Zn[terephthalate]\cdot Zn(OAc)_2$ | Precursor made from $Zn(OAc)_2\cdot 2H_2O$, $K_3[Co(CN)_6]$ and Na[terephthalate] to make $Zn_3[Co(CN)_6]_2$/Zn[terephthalate] precursor with a Zn composition of (75/25). Precursor was recrystallized with 10 eq of $Zn(OAc)_2\cdot 2H_2O$. |
| 5 | $Zn_3[Co(CN)_6]_2$/ $Zn[NCN]\cdot Zn(OAc)_2$ | Precursor made from $Zn(OAc)_2\cdot 2H_2O$, $K_3[Co(CN)_6]$ and Ca[NCN] to make $Zn_3[Co(CN)_6]_2$/Zn[NCN] precursor with composition of (60/40). Precursor was recrystallized with 10 eq of $Zn(OAc)_2\cdot 2H_2O$. |

In Example 2 in the table above, "L61" is a block copolymer surfactant commercially available as PLURONIC® L61 from BASF Corporation.

Preparation of PEC polyols

The catalysts of Examples 2-5 were used to prepare PEC polyols using a general procedure described below.

A clean and dry 300 ml autoclave, equipped with an agitator, external heating, internal cooling via a cooling coil, a propylene oxide feed line, a carbon dioxide gas feed line, a temperature sensor and a pressure sensor, was charged with 70 g of the H-functional initiator and the catalysts of Examples 2-5 above. The H-functional initiator used in these experiments was an adduct of glycerine and propylene oxide monomer with a number average molecular weight of 730, a water content <0.03% and a residual catalyst content <5 ppm. The initiator—catalyst mixture was heated to 110-130° C. under vacuum (<1 mm Hg) for 2 hours to remove any residual moisture. The vacuum system was disconnected and the reactor pressurized to 0 psi using Argon gas. Then 5 g of propylene oxide was added and the pressure increase in the reactor was monitored. Within 15-30 minutes the reactor pressure declines back to 0 psi, indicating that the multimetal cyanide compound containing catalyst has been activated and is now active. Then 170 g propylene oxide (PO) monomer is added at 110-130° C. at a constant rate of 1 g/min. After 5 minutes of the PO feed, the reactor was pressurized with $CO_2$ gas (Air Products, research grade) for the duration of the PO feed. Following the completion of the PO addition step, unreacted monomer was left to react out at 110-130° C. The reactor was then vented and cooled and the product collected. The peak molecular weight and the weight average molecular weight were determined by gel permeation chromatography. The viscosity was measured using a Brookfield DV-III rheometer. The carbonate composition of the PEC polyol was determined by IR (peak at 1745 cm−1) and calculated as weight % $CO_3$ in the polymer. Propylene carbonate formed as a by-product was not removed. The amount of propylene carbonate formed was also determined by IR and is expressed in weight %.

Example 6

The PEC polyol of Example 6 was prepared according to the general procedure described above using the multimetal cyanide compound of Example 2. An amount of 0.5 g of the multimetal cyanide compound containing catalyst was used. The reaction temperature was 130° C. and the reactor was pressurized with $CO_2$ to 300 psi. The yield of the reaction product obtained was 253 g. Its peak molecular weight was 3,883 and its weight average molecular weight was 6,362. The PEC polyol had a polydispersity Mw/Mn of 2.79. The polydispersity of a polyol is the weight average molecular weight (Mw) divided by the number average molecular weight (Mn). It is an indication of the breadth of the molecular weight distribution. A monodispersed polyol would have a value of 1.0. The carbonate content of the PEC polyol was 8.7%. Propylene carbonate was present at 3.5%.

The PEC polyol product obtained in Example 6 using the multimetal cyanide compound containing catalyst of Example 2 was prepared under identical process conditions (in particular identical reaction temperature of 130° C. and identical pressure of $CO_2$ 300 psi) as Example 10 which is a comparative PEC polyol formed with a conventional multimetal cyanide compound containing catalyst. The PEC polyol product of Example 6 demonstrated significantly increased activity toward $CO_2$ inclusion into the PEC polyol and at the same time significantly increased selectivity and reduced propylene carbonate byproduct formation.

Example 7

The PEC polyol of Example 7 was prepared according to the general procedure described above using the multimetal cyanide compound of Example 3. An amount of 0.5 g of the multimetal cyanide compound containing catalyst was used. The reaction temperature was 110° C. and the reactor was pressurized with $CO_2$ to 900 psi. The yield of the reaction product obtained was 265 g. Its peak molecular weight was 1,142 and its weight average molecular weight was 7,893. The PEC polyol had a polydispersity Mw/Mn of 3.39. The carbonate content of the PEC polyol was 16.8%. Propylene carbonate was present at 6.3%.

The PEC polyol product obtained in Example 7 using the multimetal cyanide compound containing catalyst of Example 3 was prepared under identical process conditions (in particular identical reaction temperature of 110° C. and identical pressure of $CO_2$ 900 psi) as Example 11 which is a comparative PEC polyol formed with a conventional multimetal cyanide compound containing catalyst. The PEC polyol product of Example 7 demonstrated significantly increased activity toward $CO_2$ inclusion into the PEC polyol and at the same time significantly increased selectivity and reduced propylene carbonate byproduct formation.

Example 8

The PEC polyol of Example 8 was prepared according to the general procedure described above using the multimetal cyanide compound of Example 4. An amount of 0.5 g of the multimetal cyanide compound containing catalyst was used. The reaction temperature was 110° C. and the reactor was pressurized with $CO_2$ to 900 psi. The yield of the reaction product obtained was 266 g. Its peak molecular weight was 1,235 and its weight average molecular weight was 5,403. The PEC polyol had a polydispersity Mw/Mn of 2.36. The carbonate content of the PEC polyol was 11.8%. Propylene carbonate was present at 4.5%.

The PEC polyol product obtained in Example 8 using the multimetal cyanide compound containing catalyst of Example 4 was prepared under identical process conditions (in particular identical reaction temperature of 110° C. and identical pressure of $CO_2$ 900 psi) as Example 11 which is a comparative PEC polyol formed with a conventional multimetal cyanide compound containing catalyst. The PEC polyol product of Example 8 demonstrated significantly increased activity toward $CO_2$ inclusion into the PEC polyol and at the same time significantly increased selectivity and reduced propylene carbonate byproduct formation.

Example 9

The PEC polyol of Example 9 was prepared according to the general procedure described above using the multimetal cyanide compound of Example 5. An amount of 0.5 g of the multimetal cyanide compound containing catalyst was used. The reaction temperature was 110° C. and the reactor was pressurized with $CO_2$ to 900 psi. The yield of the reaction product obtained was 268 g. Its peak molecular weight was 5,851 and its weight average molecular weight was 6,835. The PEC polyol had a polydispersity Mw/Mn of 2.82. The carbonate content of the PEC polyol was 12.5%. Propylene carbonate was present at 4.1%.

The PEC polyol product obtained in Example 9 using the multimetal cyanide compound containing catalyst of Example 5 was prepared under identical process conditions (in particular identical reaction temperature of 110° C. and identical pressure of $CO_2$ 900 psi) as Example 11 which is a comparative PEC polyol formed with a conventional multimetal cyanide compound containing catalyst. The PEC polyol product of Example 9 demonstrated significantly increased activity toward $CO_2$ inclusion into the PEC polyol and at the same time significantly increased selectivity and reduced propylene carbonate byproduct formation.

Examples 10 and 11

Comparative PEC polyols

For Examples 10 and 11, a conventional multimetal cyanide compound containing catalyst equivalent to that described above in Example 1 was used to prepare conventional PEC polyols for comparison purposes. The PEC polyols of Examples 10 and 11 were prepared by the general procedure used for preparing PEC polyols described above.

Example 10

Comparative PEC polyol

The conventional PEC polyol of Example 10 was prepared according to the general procedure described above using a conventional multimetal cyanide compound equivalent to that described in Example 1. An amount of 0.5 g of the multimetal cyanide compound containing catalyst was used. The reaction temperature was 130° C. and the reactor was pressurized with $CO_2$ to 300 psi. The yield of the reaction product obtained was 247 g. Its peak molecular weight was 1,825 and its weight average molecular weight was 2,805. The PEC polyol product had a polydispersity Mw/Mn of 1.24. The carbonate composition of the conventional PEC polyol was 3.9%. Propylene carbonate was present at 2.7%.

Example 11

Comparative PEC polyol

The conventional PEC polyol of Example 11 was prepared according to the general procedure described above using a conventional multimetal cyanide compound equivalent to that described above in Example 1. An amount of 0.5 g of the multimetal cyanide compound containing catalyst was used. The reaction temperature was 110° C. and the reactor was pressurized with $CO_2$ to 900 psi. The yield of the reaction product obtained was 287 g. Its peak molecular weight was 1,805 and its weight average molecular weight was 3,015. The PEC polyol product had a polydispersity Mw/Mn of 1.33. The carbonate composition of the conventional PEC polyol was 12.9%. Propylene carbonate was present at 15.5%.

The invention has been described in an illustrative manner, and it is to be understood that the terminology which has been used is intended to be in the nature of words of description rather than of limitation. Obviously, many modifications and variations of the present invention are possible in light of the above teachings, and the invention may be practiced otherwise than as specifically described.

What is claimed is:

1. A method of forming a polyethercarbonate polyol, said method comprising the steps of:
   providing a catalyst comprising a multimetal cyanide compound having an ordered structure defined by a cationic catalytic center and an anionic backbone spatially arranged about the cationic catalytic center;
   modifying the anionic backbone of the multimetal cyanide compound to affect the spatial arrangement and catalytic activity of the cationic catalytic center; and
   reacting an H-functional initiator, an alkylene oxide, and $CO_2$ in the presence of the modified multimetal cyanide compound to form the polyethercarbonate polyol.

2. A method as set forth in claim 1 wherein the step of modifying the anionic backbone comprises incorporating a supplemental anionic spacer into the multimetal cyanide compound.

3. A method as set forth in claim 2 wherein the supplemental anionic spacer is linear.

4. A method as set forth in claim 3 wherein the supplemental anionic spacer is of the general formula $[A_1\text{-}R\text{-}A_2]^{n-}$, wherein;
   R comprises a central organic or inorganic moiety;
   $A_1$ and $A_2$ comprise anionic substituents having a single or multiple negative charge; and
   n is an integer ranging from 1-4.

5. A method as set forth in claim 2 wherein the supplemental anionic spacer is selected from the group of dicarboxylic acid dianions, diphosphonic acid dianions, dicyanide anions, cyanamide dianions, and combinations thereof.

6. A method as set forth in claim 1 wherein the step of modifying the anionic backbone comprises modifying the anionic backbone of the multimetal cyanide compound prior to the reacting.

7. A method as set forth in claim 1 wherein the step of modifying the anionic backbone of the multimetal cyanide compound comprises modifying the anionic backbone of the multimetal cyanide compound during the reacting.

8. A method as set forth in claim 1 wherein the step of reacting the H-functional initiator, the alkylene oxide, and $CO_2$ comprises reacting the H-functional initiator, the alkylene oxide, and $CO_2$ under a positive pressure.

9. A method as set forth in claim 1 wherein the catalyst further comprises an organic complexing agent; water; a polyether; and/or a surface-active substance.

10. A method as set forth in claim 9 wherein the multimetal cyanide compound has a crystalline structure and a content of platelet-shaped particles of at least 30% by weight, based on a weight of the multimetal cyanide compound.

11. A method of forming a polyethercarbonate polyol, said method comprising the steps of:
   providing a catalyst comprising a multimetal cyanide compound having an ordered structure defined by a cationic catalytic center and an anionic backbone spatially arranged about the cationic catalytic center with the anionic backbone of the general formula $[X(CN)_y]^{z-}$
      wherein X is selected from the group of $Fe^{2+}$, $Cu^{2+}$, $Zn^{2+}$, and $Ni^{2+}$,
      y is a value from 3 to 4, and
      z is a value from 1 to 2 satisfying the valency state of X; and
   reacting an H-functional initiator, an alkylene oxide, and $CO_2$ in the presence of the multimetal cyanide compound to form the polyethercarbonate polyol.

12. A method as set forth in claim 11 wherein the anionic backbone has a crystalline structure selected from the group of trigonal planar, tetrahedral, and square planar.

13. A method as set forth in claim 11 further comprising the step of providing a second catalyst comprising a second multimetal cyanide compound having an ordered structure defined by a second cationic catalytic center and a second anionic backbone spatially arranged about the cationic catalytic center with the second anionic backbone of the general formula $[X'(CN)_{y'}]^{z'-}$
   wherein X' is selected from the group of $Fe^{2+}$, $Fe^{3+}$, $Co^{2+}$, and $Co^{3+}$,
   y' is a value of 6, and
   z' is a value from 3 to 4 satisfying the valency state of X'.

14. A method as set forth in claim 13 wherein the second anionic backbone has an octahedral crystalline structure.

15. A method as set forth in claim 11 wherein the catalyst further comprises an organic complexing agent; water; a polyether; and/or a surface-active substance.

16. A method as set forth in claim 15 wherein the multimetal cyanide compound has a crystalline structure and a content of platelet-shaped particles of at least 30% by weight, based on a weight of the multimetal cyanide compound.

17. A complex of a multimetal cyanide compound, said complex of the general formula:

$M^1_a[M^2_b(CN)_cM^3_dX_e]_f$, wherein;

$M^1$ is at least one metal ion selected from the group of $Zn^{2+}$, $Fe^{2+}$, $Co^{3+}$, $Ni^{2+}$, $Mn^{2+}$, $Co^{2+}$, $Sn^{2+}$, $Pb^{2+}$, $Fe^{3+}$, $Mo^{4+}$, $Mo^{6+}$, $Al^{3+}$, $V^{5+}$, $Sr^{2+}$, $W^{4+}$, $W^{6+}$, $Cu^{2+}$, $Cr^{2+}$, $Cd^{2+}$, $Cr^{3+}$, $Cd^{2+}$, $Hg^{2+}$, $Pd^{2+}$, $Pt^{2+}$, $V^{2+}$, $Mg^{2+}$, $Ca^{2+}$, $Ba^{2+}$, and combinations thereof, $M^2$ and $M^3$ are each individually at least one metal ion selected from the group of $Fe^{2+}$, $Fe^{3+}$, $Co^{3+}$, $Cr^{3+}$, $Mn^{2+}$, $Mn^{3+}$, $Rh^{3+}$, $Ru^{2+}$, $Ru^{3+}$, $V^{4+}$, $V^{5+}$, $Co^{2+}$, $Ir^{3+}$, $Cr^{2+}$, and combinations thereof, X is a supplemental anionic spacer; and a, b, c, d, e, and f are integers selected so that said complex is electrically neutral and c is greater than zero.

18. A complex as set forth in claim 17 wherein said supplemental anionic spacer is linear.

19. A complex as set forth in claim 18 wherein said supplemental anionic spacer is of the general formula $[A_1\text{-}R\text{-}A_2]^{n-}$, wherein;

R comprises a central organic or inorganic moiety;

$A_1$ and $A_2$ comprise anionic substituents having a single or multiple negative charge; and n is an integer ranging from 1-4.

20. A complex as set forth in claim 17 wherein said supplemental anionic spacer is selected from the group of dicarboxylic acid dianions, diphosphonic acid dianions, dicyanide anions, cyanamide dianions, and combinations thereof.

21. A complex as set forth in claim 17 further comprising an organic complexing agent; water; a polyether; and a surface-active substance.

22. A complex as set forth in claim 21 wherein said multimetal cyanide compound has a crystalline structure and a content of platelet-shaped particles of at least 30% by weight, based on a weight of the multimetal cyanide compound.

23. A method as set forth in claim 2 wherein the step of incorporating the supplemental anionic spacer into the multimetal cyanide compound comprises reacting the supplemental anionic spacer with the multimetal cyanide compound prior to the reacting of the H-functional initiator, the alkylene oxide, and the $CO_2$ to form the polyethercarbonate polyol.

24. A method as set forth in claim 2 wherein the step of incorporating the supplemental anionic spacer into the multimetal cyanide compound comprises reacting the supplemental anionic spacer with the multimetal cyanide compound during the reacting of the H-functional initiator, the alkylene oxide, and the $CO_2$ to form the polyethercarbonate polyol.

* * * * *